(12) United States Patent
Shin

(10) Patent No.: US 8,111,369 B2
(45) Date of Patent: Feb. 7, 2012

(54) METHOD FOR MANUFACTURING A LIQUID CRYSTAL DISPLAY DEVICE

(75) Inventor: Dong Su Shin, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 366 days.

(21) Appl. No.: 11/409,185

(22) Filed: Apr. 21, 2006

(65) Prior Publication Data

US 2006/0290878 A1 Dec. 28, 2006

(30) Foreign Application Priority Data

Jun. 28, 2005 (KR) .......................... 10-2005-0056121

(51) Int. Cl.
G02F 1/1339 (2006.01)
(52) U.S. Cl. ........................................ 349/157; 349/190
(58) Field of Classification Search .................. 349/155, 349/157, 190
See application file for complete search history.

(56) References Cited

U.S. PATENT DOCUMENTS

| 6,914,661 | B2 * | 7/2005 | Masuda et al. ................. 349/190 |
| 2002/0062787 | A1 * | 5/2002 | Hashizume et al. .......... 118/664 |
| 2003/0179340 | A1 * | 9/2003 | Park et al. ..................... 349/156 |
| 2004/0021819 | A1 * | 2/2004 | Kadotani ....................... 349/155 |
| 2004/0027530 | A1 * | 2/2004 | Noiri et al. .................... 349/158 |
| 2004/0183991 | A1 * | 9/2004 | Kuo ............................... 349/155 |
| 2005/0237470 | A1 * | 10/2005 | Kadotani ....................... 349/155 |
| 2006/0203177 | A1 * | 9/2006 | Cho et al. ...................... 349/155 |

FOREIGN PATENT DOCUMENTS

| CN | 1239231 | 12/1999 |
| CN | 1619363 | 5/2005 |

OTHER PUBLICATIONS

First Office Action for corresponding Chinese Patent Application Serial No. 2006100834916, dated Nov. 30, 2006.

* cited by examiner

*Primary Examiner* — Mark Robinson
*Assistant Examiner* — Erin Chiem
(74) *Attorney, Agent, or Firm* — Brinks Hofer Gilson & Lione

(57) ABSTRACT

A method for manufacturing an LCD device includes preparing first and second substrates and dispensing liquid crystal on the first substrate. A plurality of column spacers are formed on the second substrate, and a seal pattern is formed on the second substrate. The second substrate is inversed and the first and second substrates are bonded to each other to form an LCD panel having a first height (h1) corresponding to a cell gap between the first and second substrates. Pressure is applied to the rear surfaces of the first or second substrates so as to change the cell gap to a second height (h2) smaller than the first height (h2<h1).

17 Claims, 10 Drawing Sheets

METHOD FOR MANUFACTURING A LIQUID CRYSTAL DISPLAY DEVICE

PRIORITY CLAIM

This application claims the benefit of the Korean Patent Application No. P2005-56121, filed on Jun. 28, 2005, which is hereby incorporated by reference as if fully set forth herein.

TECHNICAL FIELD

The present invention relates to a liquid crystal display (LCD) device and, more particularly, to a method for manufacturing an LCD device to solve the problem of gravity and touch defects by providing an appropriate amount of liquid crystal for the manufacturing process.

DISCUSSION OF THE RELATED ART

With development of information society, demands for various display devices increase. Accordingly, many efforts have been made to research and develop various flat display devices, for example, a liquid crystal display (LCD) device, a plasma display panel (PDP), an electroluminescent display (ELD) and a vacuum fluorescent display (VFD), and some species of the flat display devices are already applied to displays of various equipments.

Among the various flat display devices, the LCD device has been most widely used due to the advantageous characteristics of compact size, thin profile, and low power consumption, whereby the LCD device substitutes for a Cathode Ray Tube (CRT). In addition to the mobile type LCD devices such as a display for a notebook computer, the LCD devices have been developed for computer monitors and televisions to receive and display broadcasting signals.

In general, the LCD device includes an LCD panel for displaying an image and a driver for supplying a driving signal to the LCD panel. In addition, the LCD panel includes first and second substrates bonded to each other, and a liquid crystal layer formed between the first and second substrates.

The first substrate (referred to as a TFT array substrate) includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions defined by the gate and data lines, and a plurality of thin film transistors transmit signals from the data lines to the pixel electrodes in accordance with signals supplied to the gate lines.

The second substrate (referred to as a color filter array substrate) includes a black matrix layer that prevents a light leakage from portions of the first substrate except at the pixel regions, an R/G/B color filter layer for displaying various colors, and a common electrode for producing an image.

In general, the method of manufacturing the LCD device is classified into two parts, a liquid crystal injection method and a liquid crystal dispersion method, according to a method of forming the liquid crystal layer.

First, the method of manufacturing the LCD device according to the liquid crystal injection method will be described as follows. The method of manufacturing the LCD device is divided into three of an array process, a cell process and a module process. The array process largely includes two steps of forming a TFT array having gate and data lines, a pixel electrode and a thin film transistor on a first substrate, and forming a color filter array having a black matrix layer, a color filter layer and a common electrode on a second substrate.

During the array process, a plurality of LCD panels are formed on one large sized glass substrate, and the TFT array and the color filter array are formed in each LCD panel region.

After that, the TFT substrate and the color filter substrate are moved to a cell process line. Subsequently, an alignment material is coated on the TFT substrate and the color filter substrate, and an alignment process (rubbing process) is performed to the substrates to obtain a uniform alignment direction in the liquid crystal molecules. At this time, the alignment process is carried out in order of processes for cleaning before deposition of an alignment layer, printing the alignment layer, baking the alignment layer, inspecting the alignment layer and rubbing the alignment layer. Accordingly, the TFT substrate and the color filter substrate are respectively cleaned.

Then, ball spacers for maintaining a cell gap between the two substrates are scattered on one of the two substrates, and a seal pattern is formed corresponding to the circumference of respective LCD panel regions to bond the two substrates to each other. At this time, the seal pattern has a liquid crystal injection inlet through which liquid crystal is injected. The ball spacers are formed of plastic balls or elastic plastic minute particles.

Then, the TFT substrate and the color filter substrate having the seal pattern therebetween are opposite to each other, and bonded to each other, and then the seal pattern is hardened. After that, the TFT substrate and the color filter substrate bonded to each other are cut into the respective LCD panel regions, thereby manufacturing the unit LCD panels each having a fixed size. Subsequently, the liquid crystal is injected to the LCD panel through the liquid crystal injection inlet, and then the liquid crystal injection inlet is sealed, thereby forming a liquid crystal layer. After an inspection process for an external appearance and an electric failure in the LCD panel, the process of manufacturing the LCD device is completed.

At this time, the process for injecting the liquid crystal will be described in brief. First, the LCD panel and a container having liquid crystal material therein are provided in a chamber, wherein the chamber is maintained in a vacuum state. That is, moisture and air bubble of the liquid crystal material and the container are removed simultaneously, and an inside space of the LCD panel is maintained in a vacuum state. Then, the liquid crystal injection inlet of the LCD panel is dipped into the container having the liquid crystal material in the vacuum state, and the vacuum state inside the chamber is changed to an atmospheric pressure. Thus, the liquid crystal material is injected to the inside of the LCD panel through the liquid crystal injection inlet according to a pressure difference between the inside the LCD panel and the chamber.

However, the method of manufacturing the LCD device of the liquid crystal injection method has the following disadvantages. First, after cutting the large sized glass substrate into the respective LCD panel regions, the liquid crystal injection inlet is dipped into the container having the liquid crystal material while maintaining the vacuum state between the two substrates. Thus, it spends great time in injecting the liquid crystal material between the two substrates, thereby lowering yield. In case of forming a large sized LCD device, it is difficult to completely inject the liquid crystal material into the inside of the LCD panel, thereby causing the failure due to incomplete injection of the liquid crystal material. Furthermore, it spends great time in injecting the liquid crystal material, and it requires a large space for liquid crystal injection devices. In order to overcome these problems of the liquid crystal injection method, the liquid crystal dispersion method has been developed, in which two substrates are bonded to each other after dispersing liquid crystal material on any one of the two substrates.

Hereinafter, the liquid crystal dispersion method will be explained as follows.

FIG. 1 is a flow chart illustrating a method of manufacturing an LCD device according to the liquid crystal dispersion method. In the method of manufacturing the LCD device according to the liquid crystal dispersion method, before bonding the two substrates, the liquid crystal is dispersed on any one of the two substrates. In this method, it is impossible to use ball spacers for maintaining a cell gap between the two substrates since the ball spacers move to a dispersion direction of liquid crystal material. Thus, instead of the ball spacers, patterned spacers or column spacers are fixed to the substrate to maintain the cell gap between the two substrates.

During an array process, a black matrix layer, a color filter layer and an overcoat layer are formed on the color filter substrate. Then, a photosensitive resin is formed on the overcoat layer, and selectively removed to form the column spacer on the overcoat layer above the black matrix layer. The column spacers may be formed in a photo process or an ink-jet process.

After that, alignment layers are respectively coated on entire surfaces of the TFT substrate and the color filter substrate including the column spacers, and a rubbing process is performed thereto. As shown in FIG. 1, after cleaning the TFT substrate and the color filter substrate (S11), the liquid crystal material is dispersed on one of the two substrates (S12), and a seal pattern is formed in the circumference of an LCD panel region on the other of the two substrates by a dispensing device (S13). At this time, it is possible to perform dispersion of the liquid crystal and formation of the seal pattern on any one of the two substrates.

After the other substrate having no dispersion of the liquid crystal material is inversed (S14), the TFT substrate and the color filter substrate are bonded to each other, and the seal patterned is hardened (S15). Subsequently, the bonded substrates are cut into the respective LCD panels (S16). Also, an inspection process (S17) for an external appearance and an electric failure in the LCD panel is performed, so that the process of manufacturing the LCD device is completed.

In the method for manufacturing the LCD device according to the liquid crystal dispensing method, the column spacers are formed on the color filter substrate, and liquid crystal is dispensed on the TFT substrate, and then the two substrates are bonded to each other, to thereby complete the LCD panel. At this time, the column spacers are fixed on the color filter substrate, and then the column spacers are in contact with the TFT substrate corresponding to any one line of the gate or data line, so as to maintain a predetermined height from the color filter substrate.

FIG. 2 is a graph of illustrating a relation between touch and gravity defects according to a dispensing amount of liquid crystal. When forming a large-sized LCD device, the liquid crystal dispensing is generally used because of the decrease of manufacturing time. Also, the column spacers are used so as to maintain a cell gap between the lower and upper substrates. As shown in FIG. 2, the density of the column spacers and the dispensing amount of liquid crystal are important factors for controlling the defect of the LCD panel.

When the LCD panel stands vertical, the liquid crystal flows down. Thus, the lower edge of the LCD panel is swollen under a high temperature due to the swelling liquid crystal, which is referred to as the gravity defect.

The touch defect is generated due to the frictional force. For example, if the LCD panel is continuously touched with a finger along a predetermined direction, the upper substrate of the LCD panel is shifted at a predetermined interval along the touch direction. At this time, in case the cylindrical column spacers are in contact with the lower and upper substrates, it causes the large frictional force between the column spacers and the two opposing substrates. Thus, it spends long time on returning the liquid crystal molecules between the column spacers to the original position, thereby causing the light leakage.

The above-explained gravity and touch defects are mutually related. That is, the gravity and touch defects are in a trade-off relation for the dispensing amount of liquid crystal. In this respect, it is very important to provide the appropriate amount of liquid crystal in consideration for the trade-off relation of the gravity and touch defects.

In the case of a small-sized LCD device, a range of the appropriate dispensing amount of liquid crystal is small. Meanwhile, in the case of a large-sized LCD device, a range of the appropriate dispensing amount of liquid crystal is large because lines of the gravity and touch defects are overlapped by a large extent.

Accordingly, the method for manufacturing the LCD device using the liquid crystal dispensing method according to the related art has the following disadvantages.

Where the liquid crystal is insufficiently provided in the LCD panel, if the LCD panel is continuously touched with a finger along a predetermined direction, the lower and upper substrates of the LCD panel are shifted by touch. At this time, in case the cylindrical column spacers are in contact with the lower and upper substrates, it causes the large frictional force between the column spacers and the two opposing substrates. Thus, it spends long time on returning the liquid crystal molecules between the column spacers to the original position, thereby causing the light leakage.

Where the liquid crystal is excessively provided in the LCD panel, when the LCD panel stands vertical, the liquid crystal flows down. Thus, the lower edge of the LCD panel is swollen under a high temperature due to the swelling liquid crystal.

The above-explained display defects are generated due to the inappropriate dispensing amount of liquid crystal.

In the meantime, when manufacturing the LCD device, the predetermined amount of liquid crystal is dispensed and dispersed on the substrate, and then the opposing two substrates are bonded to each other, to thereby form the LCD panel.

The above-explained display defects are mutually related. That is, the display defects are in a trade-off relation for the dispensing amount of liquid crystal. Especially, in the case of a large-sized LCD device, the range of the appropriate dispensing amount of liquid crystal is large because lines of the display defects are overlapped by the large extent. Accordingly, it is difficult for the large-sized LCD device to determine the optimal dispensing amount of liquid crystal for preventing the gravity and touch defects.

SUMMARY

Accordingly, the present invention is directed to a method for manufacturing an LCD device, which substantially obviates one or more problems due to limitations and disadvantages of the related art.

In accordance with one embodiment of the invention, as embodied and broadly described herein, a method for manufacturing an LCD device includes preparing first and second substrates, where each substrate has a display area, and a non-display area. A liquid crystal is applied on the first substrate and a plurality of spacers are formed on the second substrate and a seal pattern is formed on the second substrate.

The first and second substrates are bonded to each other to form an LCD panel having a first height corresponding to a cell gap between the first and second substrates. Pressure is applied to the first or second substrates so as to change the cell gap to a second height smaller than the first height.

In accordance with another embodiment, a method for manufacturing an LCD panel including providing first and second substrates and applying liquid crystal on the first substrate. The first and second substrates are bonded to each other and a cell gap is formed having a first height between the first and second substrates. Pressure is applied to at least one selected portion of the first or second substrates so as to change corresponding selected portions of the cell gap between the first or second substrates to a second height smaller than the first height. Then, pressure is applied to remaining portions of the first or second substrates so as to change corresponding remaining portions of the cell gap between the first or second substrates to the second height.

In accordance with yet another embodiment, a method for manufacturing LCD panels includes providing first and second substrates and applying liquid crystal on the first substrate. The first and second substrates are bonded to each other and a cell gap is formed having a first height between the first and second substrates where the liquid crystal does not fill the cell gap. The first and second substrates are cut into a plurality of LCD panels and pressure is applied to the first or second substrates so as to change the cell gap to a second height smaller than the first height where the second height is sufficiently small such that the liquid crystal substantially fills the cell gap.

It is to be understood that both the foregoing general description and the following detailed description of the present invention are exemplary and explanatory and are intended to provide further explanation of the invention as claimed.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method for manufacturing an LCD device to solve the problem of gravity and touch defects by providing an appropriate amount of liquid crystal will be described with reference to the accompanying drawings.

Figure 1:
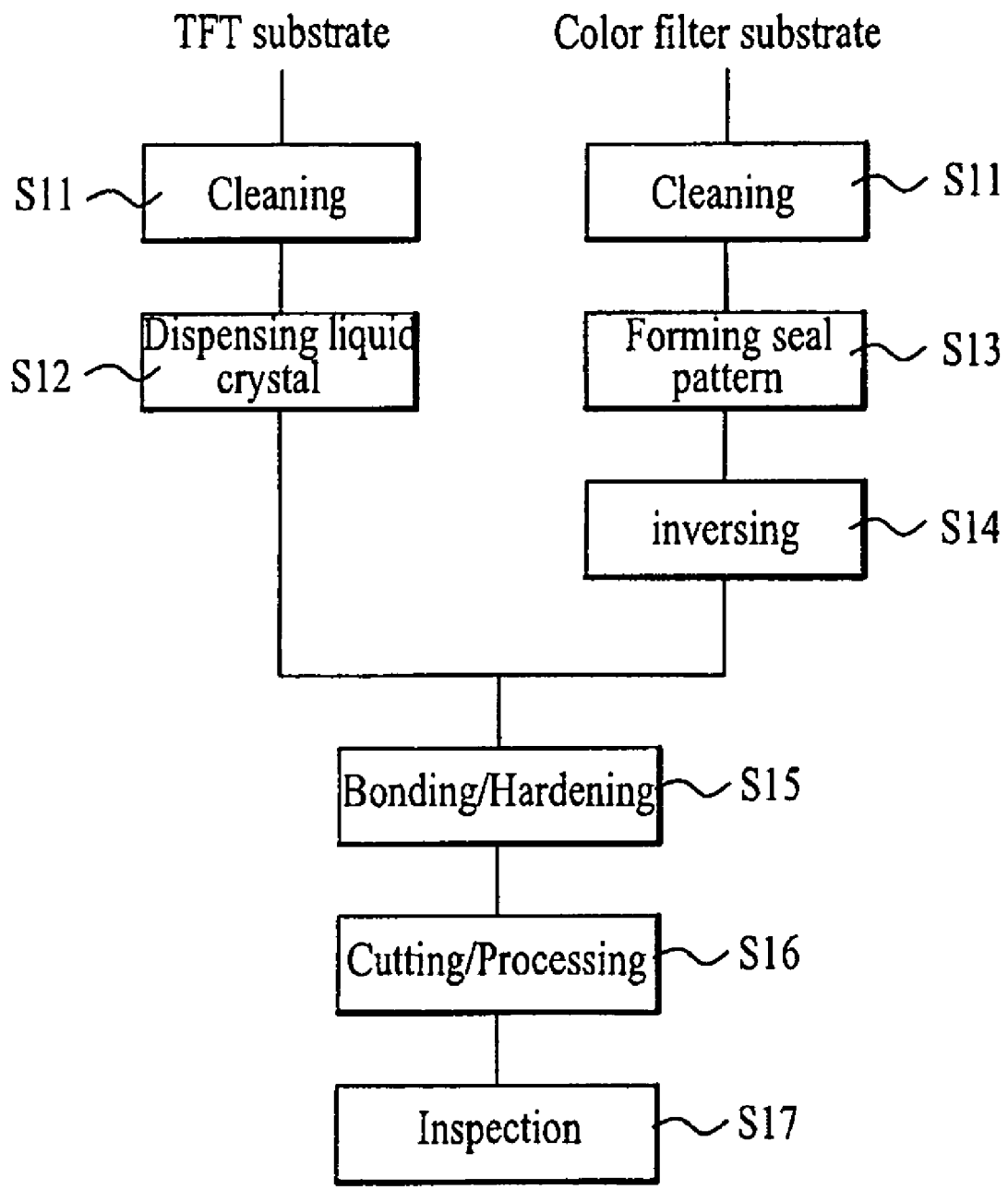
FIG. 1 is a flow chart illustrating a method for manufacturing an LCD device according to a related art liquid crystal dispersion method.
Figure 2:
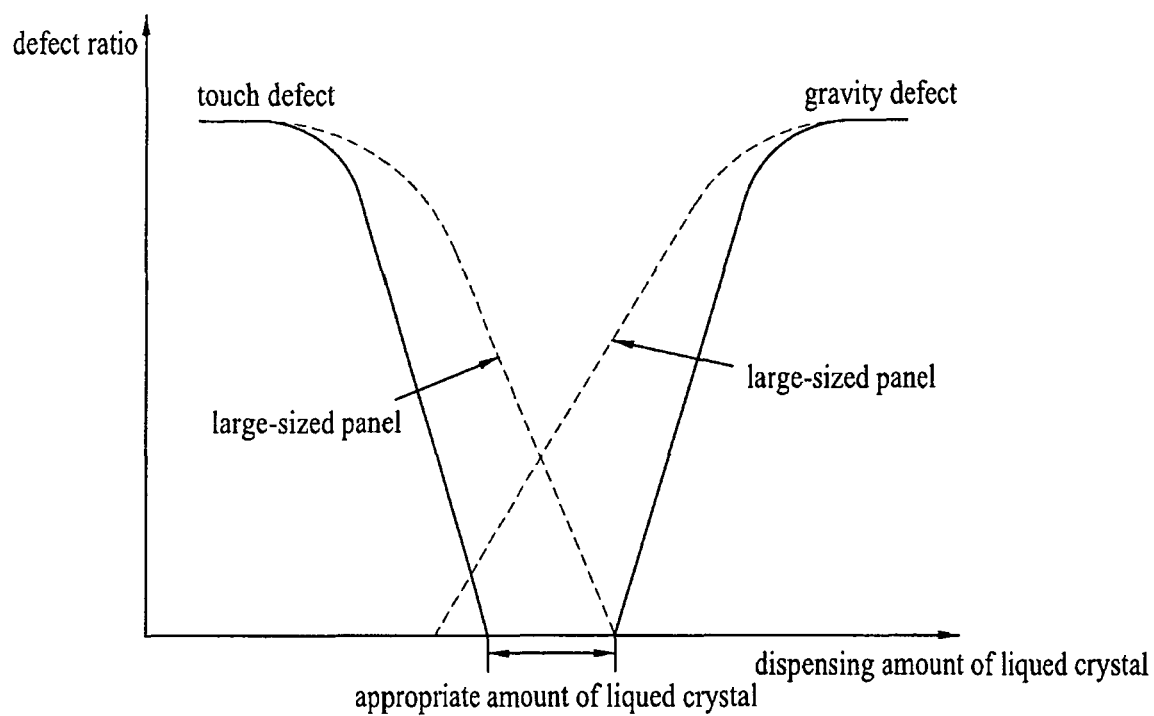
FIG. 2 is a graph illustrating a relation between touch and gravity defects according to a dispensing amount of liquid crystal.
Figure 3A:
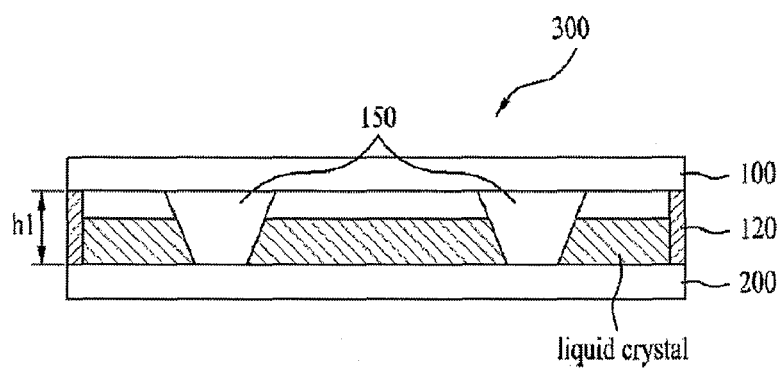
FIGS. 3A to 3C are cross sectional views illustrating a method for manufacturing an LCD device according to the first embodiment of the present invention and FIGS. 10A to 10C are cross sectional views according to a modified embodiment of the first embodiment.
Figure 3B:
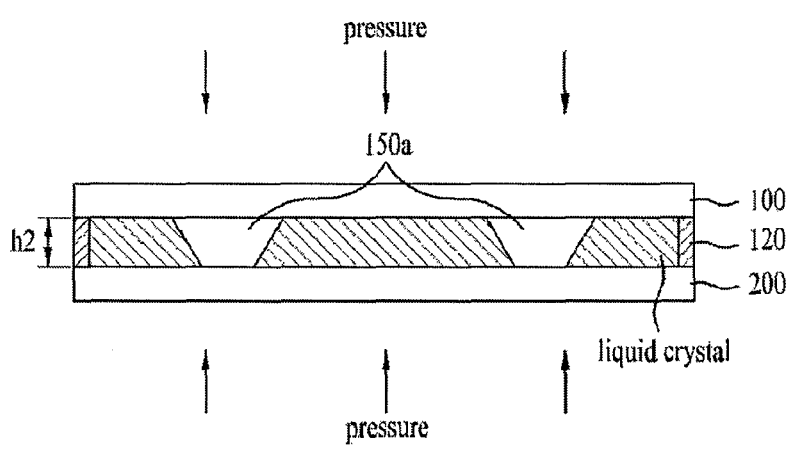
Figure 3C:
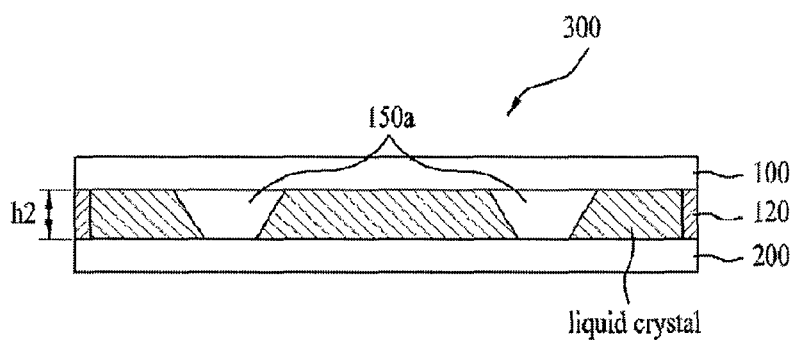
Figure 10A:
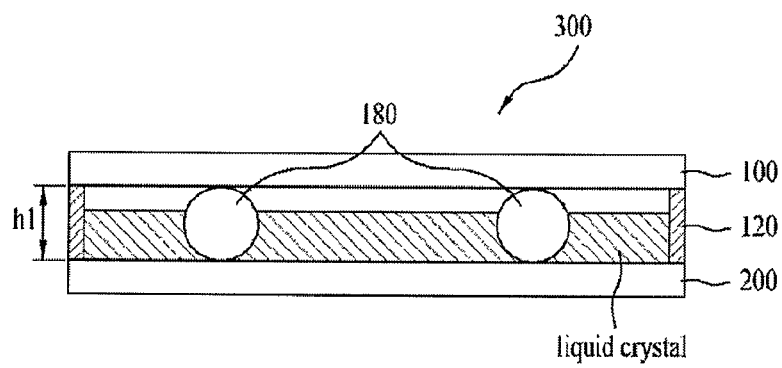
Figure 10B:
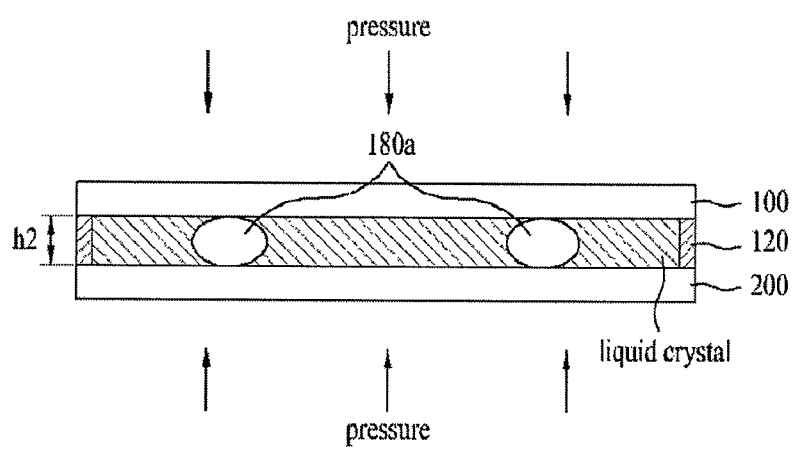
Figure 10C:
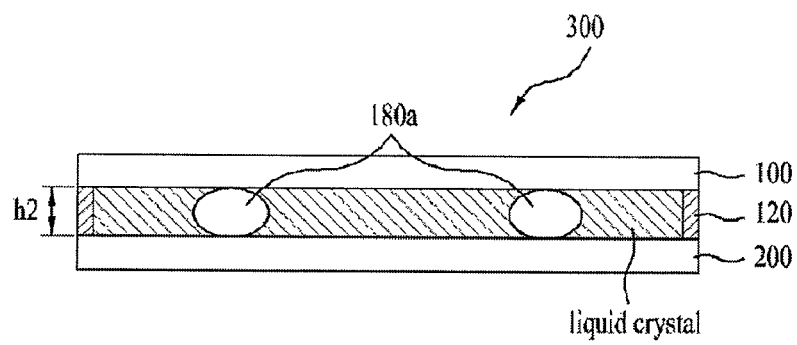

FIGS. 3A to 3C are cross sectional views illustrating a method for manufacturing an LCD device according to the first embodiment of the present invention and FIGS. 10A to 10C are cross sectional views according to a modified embodiment of the first embodiment;

In the method for manufacturing the LCD device according to the first embodiment of the present invention, a first substrate 100 of a color filter (CF) array and a second substrate 200 of a thin film transistor (TFT) array are prepared.

Each of the first and second substrates 100 and 200 may be formed of a mother substrate for defining a plurality of substrates of LCD panels (that is, TFT substrates and CF substrates), or a substrate for one substrate for an LCD panel. If each of the first and second substrates 100 and 200 is formed of the mother substrate, each substrate for the LCD panel has the corresponding array. Each of the first and second substrates 100 and 200 has a display area and a non-display area, wherein the display area is positioned in the center of the substrate 100 and 200, and the non-display area is positioned in the periphery of the substrate 100 and 200. Also, column spacers 150 are formed on the display area of the first substrate 100 corresponding to lines (gate and data lines (not shown)) of the second substrate 200. Although the embodiments described herein refer to column spacers, it is to be understood that the invention is not limited to column spacers and other kinds of spacers, such as ball spacers 180 (180a) can also be used as shown in FIGS. 10A~10C.

At this time, when bonding the first and second substrates 100 and 200 to each other, each of the column spacers 150 has a first height (h1) which is roughly 0.1 μm higher than a general height required for a liquid crystal dispensing process. For example, supposing that an optimal height of the column spacer 150 for maintaining a cell gap (h2) so as to completely fill a space between the first and second substrates 100 and 200 with liquid crystal is about 3.1 μm. In this case, when bonding the first and second substrates 100 and 200 to each other in the method for manufacturing the LCD device according to the present invention, the column spacer has the height of about 3.1 to about 3.2 μm, preferably, about 3.11 to about 3.13 μm. Then, liquid crystal (not shown) is dispensed on the second substrate 200, and a seal pattern 120 is formed on the non-display area of the first substrate 100.

As shown in FIG. 3A-3C, after the color filter array of the first substrate 100 is positioned opposite to the thin film transistor array of the second substrate 200, the first and second substrates 100 and 200 are bonded to each other by pressure. After the bonding process, an interval between the first and second substrates 100 and 200 corresponds to the first height (h1) which is slightly higher than a general cell gap of a completed LCD panel. When applying the press to the first and second substrates 100 and 200, the column spacer 150 and the seal pattern 120 are brought into contact with the opposing second substrate 200. Accordingly, the first and second substrates 100 and 200 are sealed by the seal pattern 120, thereby forming an LCD panel 300.

After bonding, the amount of liquid crystal provided between the first and second substrates 100 and 200 is slightly less than the amount of liquid crystal required in the space corresponding to the interval maintained by the column spacer 150 between the first and second substrates 100 and 200. As explained above, the column spacer 150 of the present invention is slightly higher than the general column spacer. That is, the space formed by the column spacer 150 and the seal pattern 120 is not completely filled with the liquid crystal provided between the first and second substrates 100 and 200.

The cell gap (h1) of the liquid crystal provided between the first and second substrates 100 and 200 is controlled by the height of the column spacer 150. By the bonding process, the column spacer 150 is in contact with the opposing second substrate 200, to thereby support the cell gap and define the space formed between the first and second substrates 100 and 200.

The first substrate 100 is comprised of the plurality of CF substrates, and the second substrate 200 is comprised of the plurality of TFT substrates, wherein each of the CF substrates is positioned in opposite to each of the TFT substrates, to thereby form the unit LCD panel. After the bonding process of FIG. 3A, the first and second substrates 100 and 200 are cut to the LCD panels 300 by scribing and breaking.

Referring to FIG. 3B, by applying the pressure to the LCD panel 300 from lower and upper sides, the interval (h1) between the first and second substrates 100 and 200 is decreased to a second height (h2). In this case, the second height (h2) corresponds to the general cell gap required in the LCD panel 300.

In the meantime, the difference between the first height (h1) and the second height (h2) is within about 0.1 μm, so as to prevent the seal pattern from being deformed during a second pressing process. At this time, since the first height (h1) of the bonding process is higher than the general height of the column spacer, the cell gap is adjusted to be slightly higher than the related art. Then, the second height (h2) is formed by the additional pressing process, whereby the column spacer is pressed by a predetermined thickness. Applying pressure can be carried out by applying mechanical pressure or pneumatic pressure, such as air pressure or gas pressure.

At this time, the column spacer 150a is pressed by the predetermined thickness corresponding to the difference between the first height (h1) and the second height (h2). Accordingly, the LCD panel 300 has the optimal cell gap (h2) corresponding to the amount of liquid crystal provided.

In the case of the LCD panel manufactured by the present invention, the interval between the first and second substrates 100 and 200 in the bonding process is larger than the desired cell gap, whereby the space formed by the column spacer and the seal pattern is not completely filled with the liquid crystal provided between the first and second substrates 100 and 200. Accordingly, the touch defect may be generated due to the insufficient amount of liquid crystal provided.

By the following pressing process, the LCD panel is pressed to have the appropriate cell gap corresponding to the amount of liquid crystal provided. As a result, the space of the LCD panel is completely filled with the liquid crystal provided, to thereby maintain the uniform cell gap in the entire LCD panel. That is, it is possible to prevent the defects caused by the inappropriate amount of liquid crystal provided, thereby improving the picture quality.

One of the first and second substrates is put over the other substrate by a vacuum apparatus (VALC), and then the two substrates are bonded by a pressure difference the inside of the LCD panel and the outside of the LCD panel in a chamber. By the pressing process, external air pressure is applied to the LCD panel using a pressure apparatus which is used for a general liquid crystal injection process. That is, the air pressure is applied to the rear surfaces of the first or second substrates.

Figure 4A:
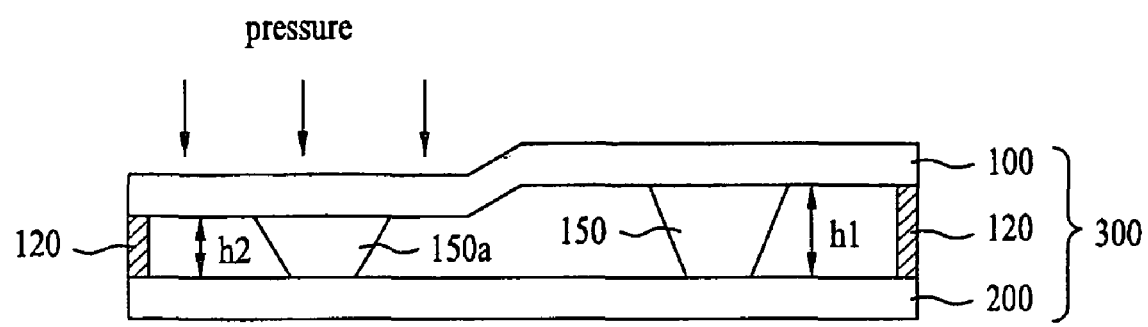
FIGS. 4A and 4B are cross sectional views illustrating a method for manufacturing an LCD device according to the second embodiment of the present invention.
Figure 4B:
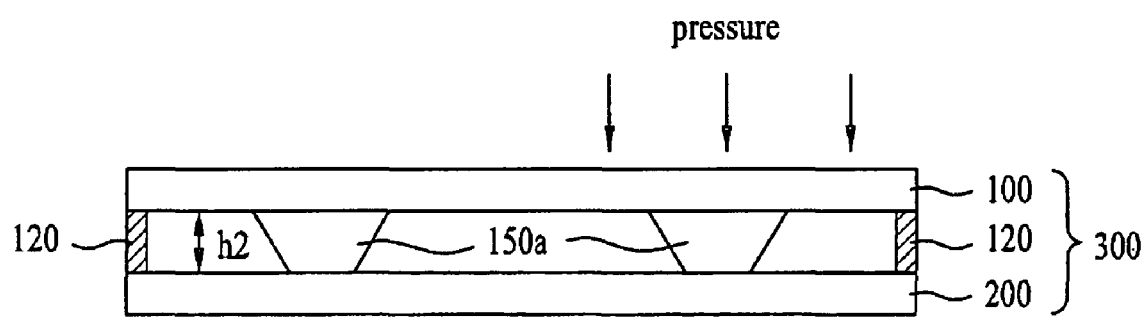

FIGS. 4A and 4B are cross sectional views of illustrating a method for manufacturing an LCD device according to the second embodiment of the present invention.

In the method for manufacturing the LCD device according to the second embodiment of the present invention, as shown in FIG. 4A, an air pressure is applied to selective areas of an LCD panel 300, whereby a cell gap of the corresponding area is decreased to a second height (h2). Referring to FIG. 4B, an air pressure is applied to the other areas of the LCD panel 300, so that the cell gap is also decreased to the second height (h2). In this case, a pressing apparatus applies a constant pressure to the selective areas of the LCD panel 300.

The second embodiment of the present invention can prevent a seal pattern 120 from being deformed when applying the constant pressure to the rear surfaces of first or second substrates 100 and 200.

In the method for manufacturing the LCD device according to the second embodiment of the present invention, it is important to prevent the substrate from being damaged when applying the air pressure to the selective areas of the LCD panel. That is, the pressed thickness of the LCD panel 300 is maintained within about 0.1 μm. In addition, the LCD panel 300 has a constant height without difference after completing the pressing process.

Figure 5:
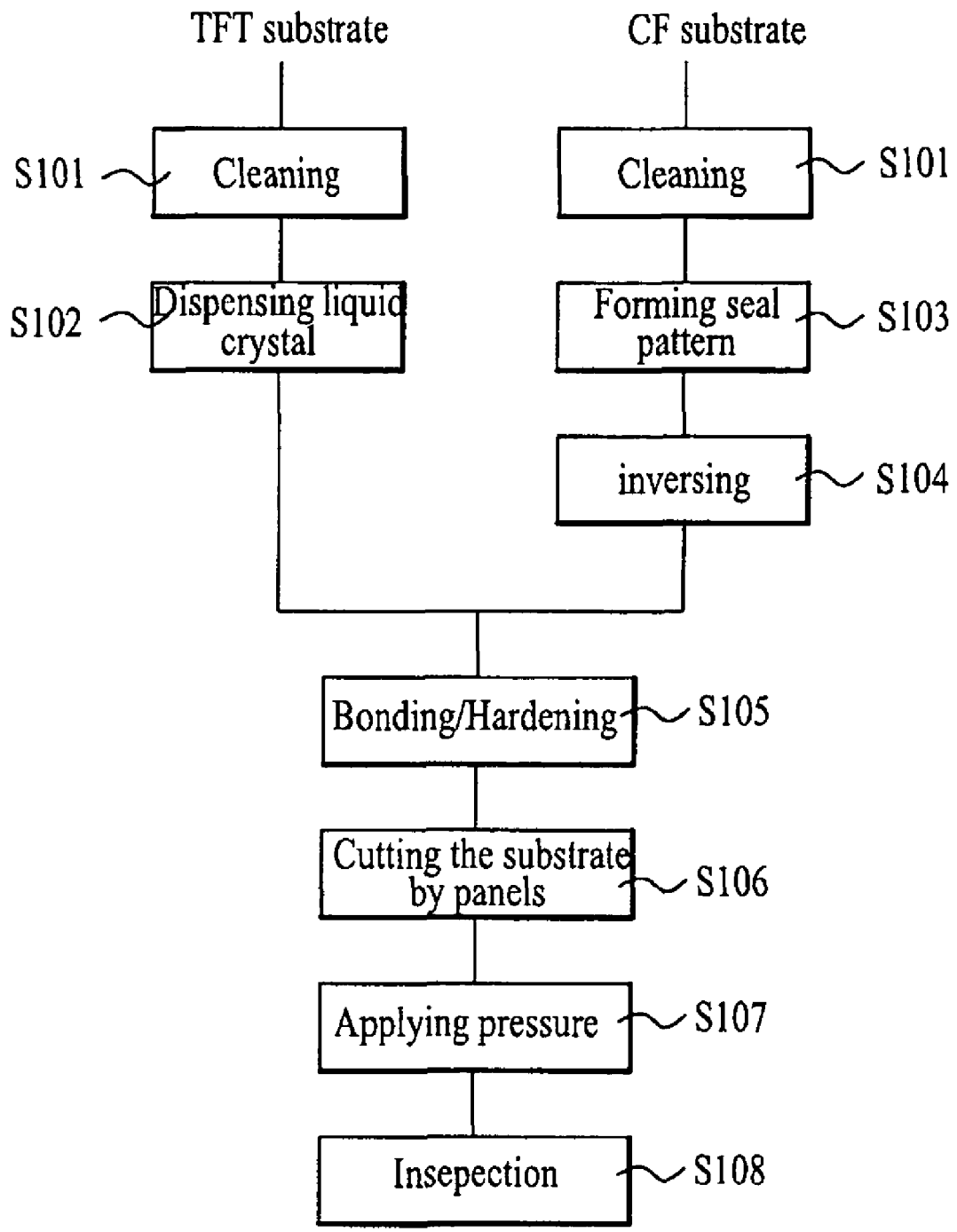
FIG. 5 is a flow chart illustrating a method for manufacturing an LCD device according to the present invention.

FIG. 5 is a flow chart of illustrating a method for manufacturing an LCD device according to an embodiment of the invention.

In an array process of an LCD device according to the present invention, a black matrix layer, a color filter layer and a common electrode are formed on a first substrate (CF substrate) 100. Then, a photosensitive resin is formed on the common electrode, and is then selectively removed, to thereby form a column spacer on the black matrix layer. The column spacer may be formed in a patterning process using photo.

The column spacer of the LCD device according to the present invention is roughly 0.1 μm higher than a general height required for a liquid crystal dispensing process. For example, when a cell gap of a pixel region (including a gate insulating layer, an insulating interlayer and a pixel electrode provided on a second substrate, and including the color filter layer provided on the first substrate) of an LCD panel using the general liquid crystal dispensing process is about 3.4 μm, the column spacer of the completed LCD panel has the height of about 3.1 μm to be lower than the cell gap of the pixel region since the column spacer is formed on the area except the pixel region, for example, on the gate line of the second substrate, and the black matrix layer is additionally formed on the first substrate.

In the method for manufacturing the LCD device according to the present invention, when forming the column spacer, the column spacer is formed to have the height of about 3.11 μm to about 3.20 μm which is 0.1 μm higher than the final height of the column spacer. After performing the bonding and pressing processes to maintain the cell gap, the final height of the column spacer is about 3.1 μm.

At this time, the column spacer is fixed on the first substrate 100, and the column spacer having the predetermined height is in contact with the second substrate (TFT substrate) corresponding to any one line of gate and data lines. On the first substrate 200, the gate and data lines crossing each other are formed so as to define a unit pixel region, and a pixel electrode is formed in the unit pixel region, to thereby form a thin film transistor array. Then, alignment layers are formed on entire surfaces of the first substrate and the second substrate, and are then rubbed.

After completing the alignment process, as shown in FIG. 5, the TFT substrate and the CF substrate are cleaned (S101), and liquid crystal is dispensed on any one of the TFT substrate and the CF substrate (S102). After that, a seal pattern is formed on the periphery of the other substrate using a dispensing apparatus. At this time, it is possible to form both the seal pattern and the liquid crystal on any one substrate of the TFT substrate and the CF substrate.

After the other substrate having no dispersion of the liquid crystal is inversed (S104), the TFT substrate and the CF substrate are bonded to each other by pressure, and the seal patterned is hardened (S105). When bonding the TFT substrate to the CF substrate, the column spacer is slightly pressed by the opposing TFT substrate.

Subsequently, the bonded substrates are cut into the respective LCD panels (S106). Then, during the pressing of the LCD panel, the column spacer is slightly pressed by a predetermined thickness, to thereby form the cell gap corresponding to the dispensed amount of liquid crystal provided in the LCD panel (S107). Also, an inspection process (S108) for an external appearance and an electric failure test of the LCD panel is performed, and the process of manufacturing the LCD device is completed.

Figure 6:
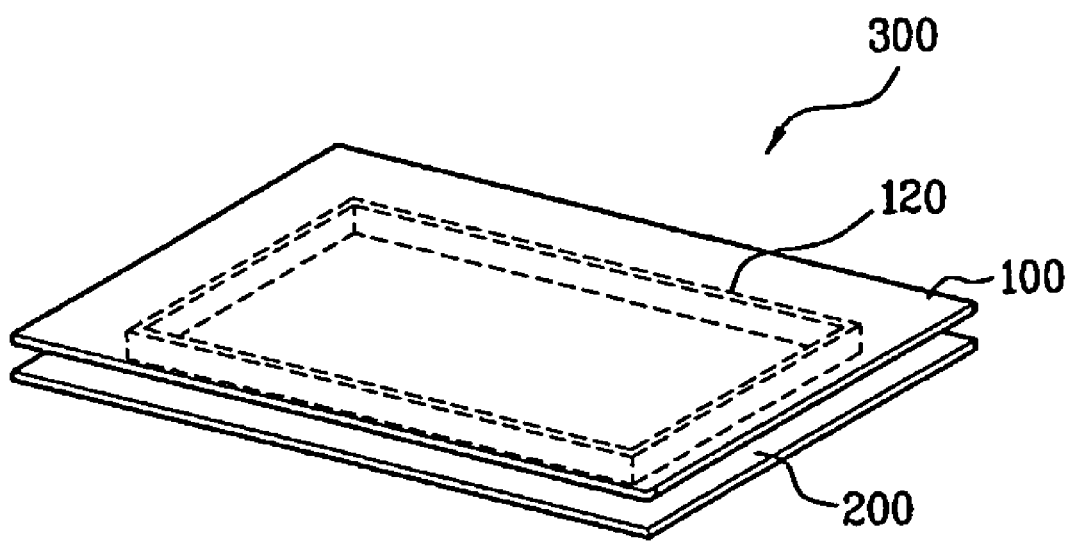
FIG. 6 is a perspective view illustrating an LCD panel before performing a pressing process in a method for manufacturing an LCD device according to the present invention.

FIG. 6 is a perspective view of illustrating an LCD panel before performing a pressing process in a method for manufacturing an LCD device according to the present embodiment.

In the method for manufacturing the LCD device according to the present embodiment, the bonding and pressing process is performed after completely sealing the LCD panel with the seal pattern 120. That is, the seal pattern 120 is formed by continuously drawing the periphery of the LCD panel before bonding. When bonding the two substrates, the seal pattern is in contact with the opposing substrate, and the seal pattern is hardened by UV irradiation. As the interior of the LCD panel inside the seal pattern is maintained in a vacuum state, the bonding process is performed.

Figure 7:
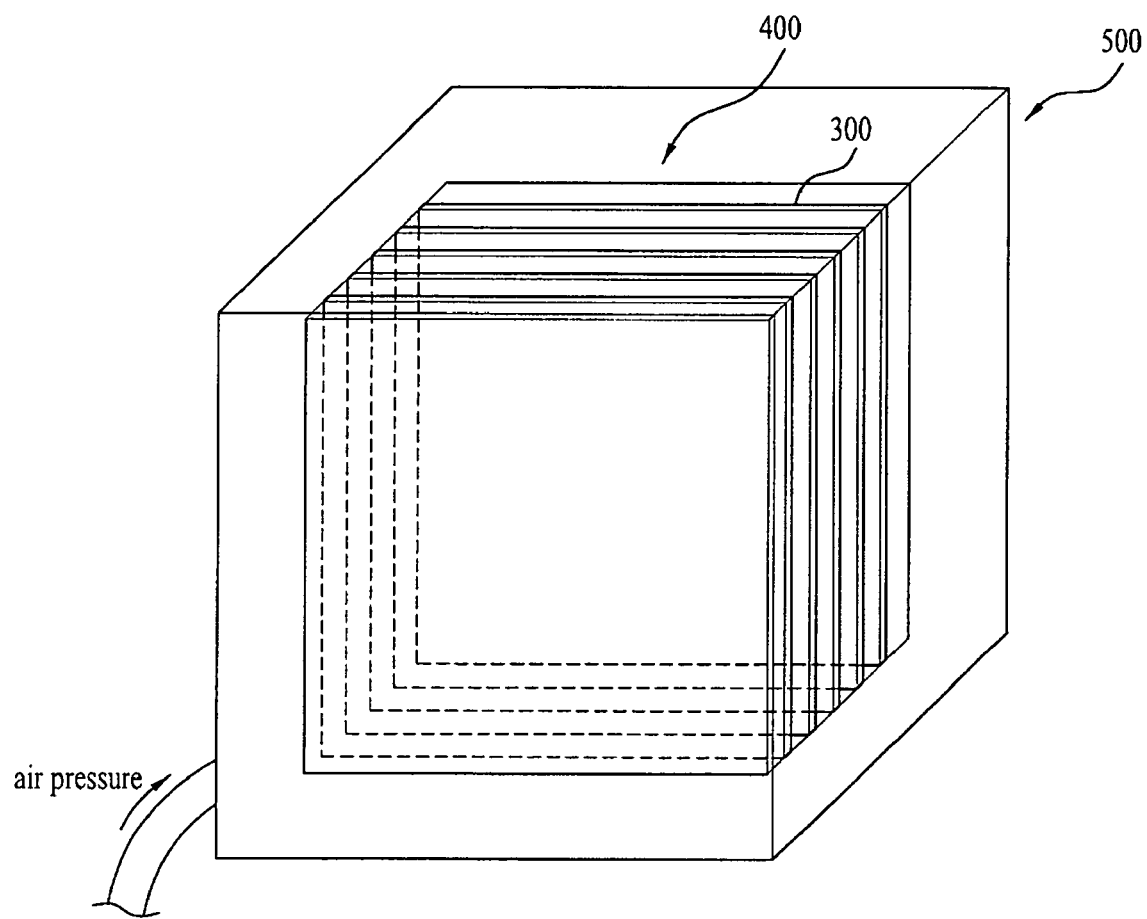
FIG. 7 is a perspective view illustrating a chamber when performing a pressing process in a method for manufacturing an LCD device according to the present invention.

FIG. 7 is a perspective view of illustrating a chamber when performing a pressing process in a method for manufacturing an LCD device according to the present embodiment. As shown in FIG. 7, the chamber 500 for the pressing process is comprised of a plurality of cassettes 400 arranged at fixed intervals. As the LCD panels 300 are loaded to the cassettes 400 of the chamber 500, the air pressure is supplied to the chamber through a gas pipe. Accordingly, the air pressure is applied to the rear surfaces of the first or second substrates for the LCD panel. That is, the LCD panel is pressed in a direction for being vertical to the substrate surface.

Figure 8:
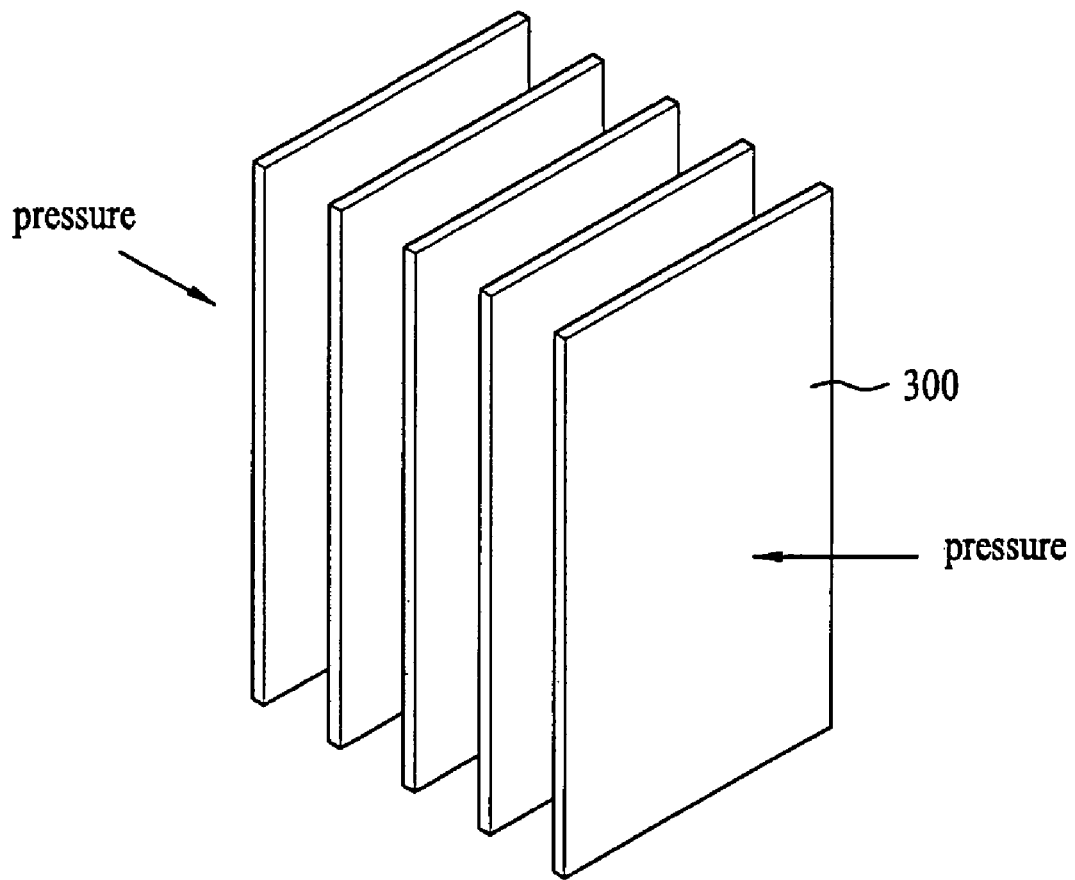
FIG. 8 is a schematic view illustrating an LCD panel pressed by air when performing a pressing process in a method for manufacturing an LCD device according to the present invention.

FIG. 8 is a schematic view of illustrating an LCD panel pressed by air when performing a pressing process in a method for manufacturing an LCD device according to the present embodiment. Referring to FIG. 8, when the LCD panel is positioned inside the cassette for the pressing process, the LCD panel is vertically positioned and pressed in a direction perpendicular to the substrate surface. Accordingly, the first height (h1) (FIG. 3A) of the LCD panel 300 which causes the incomplete filling of liquid crystal in the space between the first and second substrates is changed to the second height (h2) (FIGS. 3B, 4A-4C) corresponding to the appropriate cell gap.

Figure 9:
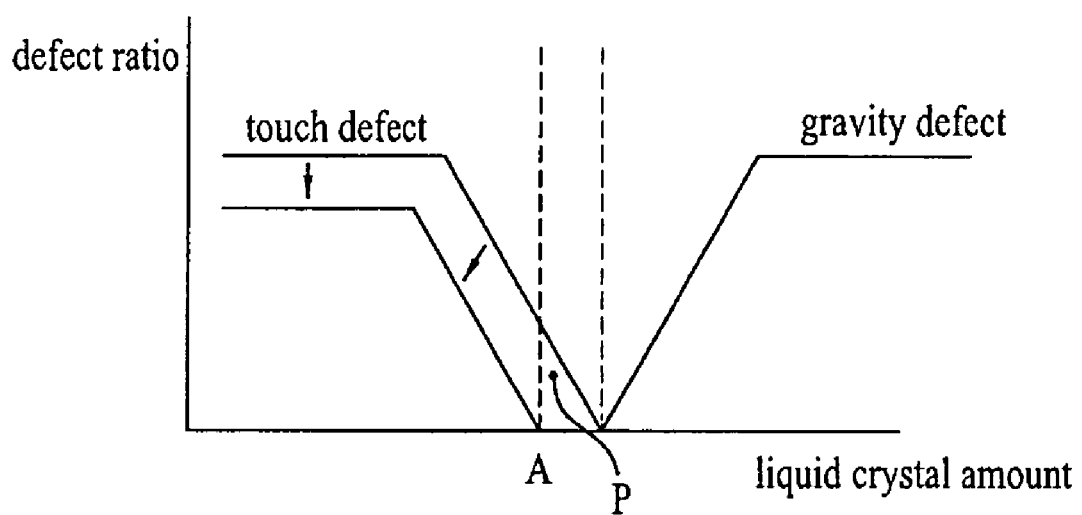
FIG. 9 is a graph illustrating a relation between touch and gravity defects according to the amount of liquid crystal after performing a pressing process in a method for manufacturing an LCD device according to the present invention.

FIG. 9 is a graph of illustrating a relation between touch and gravity defects according to the amount of liquid crystal after performing a pressing process in a method for manufacturing an LCD device according to the present invention.

In the LCD device according to the present invention, as shown in FIG. 9, the column spacer is slightly higher than the general column spacer, and it may have the touch defect due to the insufficient liquid crystal provided. By the bonding process, the first and second substrates are bonded to each other with the cell gap which is slightly higher than the general cell gap.

As the air pressure is applied to the LCD panel, the cell gap is decreased so that the space between the two substrates is also decreased. Accordingly, the space provided between the two substrates is completely filled with the dispensed liquid crystal. In the graph of FIG. 9, the touch defect ratio of the corresponding LCD panel is shifted left, to thereby increase the margin in the appropriate amount of liquid crystal. For example, if the liquid crystal is provided in a point 'P', the LCD panel is under the condition of touch defect in the bonding process. However, after the bonding process, the LCD panel is under the condition having no deterioration quality of image.

In the method for manufacturing the LCD device according to the present embodiment, the column spacer is formed on the upper substrate of the LCD panel, wherein the column spacer is slightly higher than the general height of the liquid crystal dispensing process. Then, the opposing lower and upper substrates are bonded to each other with the slightly high cell gap, and then the pressure is applied to the rear surfaces of the LCD panel, whereby the cell gap is decreased to the range for completely filling the space between the lower and upper substrates with the provided liquid crystal.

That is, the LCD panel which is not completely filled with the liquid crystal is intentionally manufactured in the liquid crystal dispensing process, and then the LCD panel is completely filled with the liquid crystal by the pressing process after the bonding process, to thereby prevent the defects caused by the inappropriate amount of liquid crystal.

As mentioned above, the method for manufacturing the LCD device according to the present embodiment has the following advantages.

When dispensing the liquid crystal, it is difficult to provide the same amount of liquid crystal to each of the substrates. After the liquid crystal dispensing process, the first and second substrates are bonded to each other, and then the space provided between the first and second substrates is filled with the dispensed liquid crystal. That is, it is impossible to check whether the dispensed amount of liquid crystal is appropriate for the LCD panel or not. Also, the amount of liquid crystal for dispensing is determined in consideration for the height of the column spacers of some areas. However, it is very difficult to monitor the precise height of the column spacer.

If the LCD panel has the insufficient liquid crystal or the excessive liquid crystal, the display defect is generated.

In the method for manufacturing the LCD device according to the present invention, the column spacer after forming is slightly higher than the general cell gap. Accordingly, on the bonding process, the space formed by the column spacer and the seal pattern is not completely filled with the liquid crystal provided between the first and second substrates. As performing the additional pressing process to the LCD panel, the cell gap is slightly decreased so that the space between the first and second substrates is completely filled with the dispensed liquid crystal. Accordingly, the LCD panel has no defects caused by the inappropriate amount of liquid crystal.

In the method for manufacturing the LCD device according to the present invention, the LCD panel which is not completely filled with the liquid crystal is intentionally manufactured in the liquid crystal dispensing process, and then the LCD panel is completely filled with the liquid crystal by the pressing process after the bonding process, to thereby prevent the defects caused by the inappropriate amount of liquid crystal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an LCD device comprising the following sequence:
   (1) preparing first and second substrates, each substrate having a display area, and a non-display area, wherein the first and second substrates are for a plurality of LCD panels;
   (2) dispensing liquid crystal on the first substrate;
   (3) forming a plurality of spacers on the second substrate as a first height;
   (4) forming a seal pattern on the second substrate;
   (5) bringing the spacers into contact with the first and second substrates and bonding the first and second substrates to each other to form a plurality of LCD panel to form a cell gap having the first height between the first and second substrates by the seal pattern, wherein the liquid crystal does not completely fill the cell gap of the first height;
   (6) cutting the first and second substrates into the plurality of LCD panels after bonding the first and second substrates to each other; and
   (7) applying pressure to at least one of the first and second substrates so as to change the cell gap to a second height that is 0.1 µm less than the first height, wherein applying pressure is processed until completely filling the cell gap of the second height with the dispensed liquid crystal and the spacers are pressed by the difference between the first height and the second height,
   wherein each of the spacers between the first and second substrates has the same first height before bonding step.

2. The method of claim 1, wherein applying pressure comprises applying pneumatic pressure.

3. The method of claim 1, wherein applying pressure comprises applying mechanical pressure.

4. The method of claim 1, wherein applying pressure comprises applying pressure to the entire rear surfaces of the first and second substrates.

5. The method of claim 1, wherein applying pressure comprises applying pressure to selective areas of the LCD panel.

6. The method of claim 1, wherein forming the seal pattern is provided in a periphery of the first and second substrates.

7. The method of claim 1 further comprising forming a thin film transistor array on the first substrate and a color filter array on the second substrate after preparing the first and second substrates.

8. The method of claim 1 forming a plurality of spacers comprises forming a plurality of ball spacers.

9. The method of claim 1 forming a plurality of spacers comprises forming a plurality of column spacers.

10. A method for manufacturing an LCD panel the following sequence:
    (1) providing first and second substrates, wherein the first and second substrates are for a plurality of LCD panels, and forming a plurality of spacers on the second substrate as a first height;
    (2) dispensing an insufficient amount of liquid crystal on the first substrate;
    (3) bonding the first and second substrates to each other to form a plurality of LCD panel and forming a cell gap having the first height between the first and second substrates, wherein the liquid crystal does not completely fill the cell gap of the first height;
    (4) cutting the first and second substrates into the plurality of LCD panels after bonding the first and second substrates to each other;
    (5) applying pressure to at least one selected portion of the first or second substrates so as to change corresponding selected portions of the cell gap between the first or second substrates to a second height that is 0.1 µm less than the first height; and
    (6) applying pressure to remaining portions of the first or second substrates so as to change corresponding remaining portions of the cell gap between the first or second substrates to the second height, wherein applying pressure is processed until substantially filling the cell gap of the second height with the dispensed liquid crystal and the spacers are pressed by the difference between the first height and the second height,
    wherein each of the spacers between the first and second substrates has the same first height before bonding step.

11. The method of claim 10, wherein applying pressure comprises applying pneumatic pressure.

12. The method of claim 10, wherein applying pressure comprises applying mechanical pressure.

13. The method of claim 10 further comprising forming a plurality of spacers on a display area of the second substrate, and forming a seal pattern on a non-display area of the second substrate.

14. A method for manufacturing LCD panels comprising the following sequence:
    (1) providing first and second substrates, wherein the first and second substrates are for a plurality of LCD panels and forming a plurality of spacers on the second substrate as a first height;
    (2) dispensing liquid crystal on the first substrate;
    (3) bonding the first and second substrates to each other to form a plurality of LCD panel and forming a cell gap having the first height between the first and second substrates, wherein the liquid crystal does not fill the cell gap of the first height;
    (4) cutting the first and second substrates into the plurality of LCD panels; and
    (5) applying pressure to at least one of the first and second substrates so as to change the cell gap to a second height that is 0.1 µm less than the first height, wherein applying pressure is processed until substantially filling the cell gap of the second height with the dispensed liquid crystal and the spacers are pressed by the difference between the first height and the second height,
    wherein each of the spacers between the first and second substrates has the same first height before bonding step.

15. The method of claim 14, wherein applying pressure comprises placing the LCD panels in pressure chamber and pressurizing the chamber.

16. The method of claim 15, wherein applying pressure comprises applying air pressure.

17. The method of claim 14, wherein applying pressure comprises applying mechanical pressure.

* * * * *